US007800047B2

(12) United States Patent
Browning, Jr. et al.

(10) Patent No.: US 7,800,047 B2
(45) Date of Patent: Sep. 21, 2010

(54) APPARATUS AND METHOD FOR A COMPUTERIZED FIBER OPTIC SECURITY SYSTEM

(75) Inventors: Thomas E. Browning, Jr., Spartanburg, SC (US); Mary H. Owens, Greenville, SC (US)

(73) Assignee: Woven Electronics, LLC, Mauldin, SC (US)

( * ) Notice: Subject to any disclaimer, the term of this patent is extended or adjusted under 35 U.S.C. 154(b) by 0 days.

(21) Appl. No.: 11/083,038

(22) Filed: Mar. 17, 2005

(65) Prior Publication Data

US 2006/0097140 A1 May 11, 2006

Related U.S. Application Data

(63) Continuation-in-part of application No. PCT/US2004/013494, filed on May 3, 2004, which is a continuation-in-part of application No. 10/429,602, filed on May 5, 2003, now abandoned.

(60) Provisional application No. 60/626,197, filed on Nov. 9, 2004.

(51) Int. Cl.
*G01J 1/04* (2006.01)
*G08B 13/18* (2006.01)

(52) U.S. Cl. ................................. 250/227.14; 340/555

(58) Field of Classification Search ................. 250/221, 250/222.1, 227.14; 340/541, 545.2, 545.3, 340/555–557, 571, 825.49, FOR. 402, 552; 356/73, 73.1; 398/9, 17, 20, 21
See application file for complete search history.

(56) References Cited

U.S. PATENT DOCUMENTS

| | | | | |
|---|---|---|---|---|
| 4,369,437 | A | | 1/1983 | Thompson, Jr. et al. |
| 4,447,123 | A | * | 5/1984 | Page et al. .................. 385/115 |
| 4,777,476 | A | | 10/1988 | Dank |
| 4,814,562 | A | | 3/1989 | Langston |
| 4,829,286 | A | | 5/1989 | Zvi |
| 5,049,855 | A | | 9/1991 | Slemon et al. |
| 5,055,827 | A | * | 10/1991 | Philipp .................... 340/568.4 |
| 5,134,386 | A | * | 7/1992 | Swanic ....................... 340/541 |
| 5,434,557 | A | | 7/1995 | Alizi |

(Continued)

FOREIGN PATENT DOCUMENTS

GB 2091874 * 8/1982

(Continued)

*Primary Examiner*—Thanh X Luu
(74) *Attorney, Agent, or Firm*—McNair Law Firm, PA; Cort Flint

(57) ABSTRACT

A computerized apparatus and method for detecting unauthorized activity in a protected area in real-time using a fiber optic cable having an optical sensor line, a fiber scanning unit, and a computer. Detecting unauthorized activity is done by scanning the sensor line using the scanning unit to obtain repetitive scan signals representing the state of the sensor line, receiving scan signals at the computer, processing the scan signals to determine an initial baseline representing the normal state of the sensor line, storing the baseline, continuously monitoring the sensor line using the scan signals received in real-time by the computer, comparing the scan signal to the baseline, determining if a fault has occurred based on an predetermined attenuation change in one or more of the scan signals as compared to the baseline, generating a fault signal, and providing a warning of a fault in response to the fault signal.

20 Claims, 10 Drawing Sheets

U.S. PATENT DOCUMENTS

| | | | | |
|---|---|---|---|---|
| RE35,020 | E * | 8/1995 | Quinlan | 385/13 |
| 5,592,149 | A | 1/1997 | Alizi | |
| 5,594,239 | A | 1/1997 | Lessing | |
| 5,790,285 | A * | 8/1998 | Mock | 398/21 |
| 6,002,501 | A * | 12/1999 | Smith et al. | 398/9 |
| 6,980,108 | B1 * | 12/2005 | Gebbia et al. | 340/555 |
| 7,123,785 | B2 * | 10/2006 | Iffergan | 385/13 |
| 2004/0233054 | A1 * | 11/2004 | Neff et al. | 340/539.1 |
| 2005/0077455 | A1 * | 4/2005 | Townley-Smith et al. | 250/227.27 |

FOREIGN PATENT DOCUMENTS

WO WO 2004/100095 A2 11/2004

* cited by examiner

B
Validate Password?
120
No
122
Return to configure sensors or proceed to monitoring options
Yes
124
Edit Description?
Yes
126
User enters information for sensor to edit
128
User enters edits
130
Sensor updated
No
132
Delete Sensor?
Yes
134
User enters information for sensor to delete
136
Delete?
Yes
138
Sensor Deleted
No
No
144
Exit Edit?
Yes
Return to step 60
No

APPARATUS AND METHOD FOR A COMPUTERIZED FIBER OPTIC SECURITY SYSTEM

CROSS REFERENCE TO RELATED APPLICATION

This application is a continuation-in-part and claims priority from U.S. Provisional Application Ser. No. 60/626,197, filed Nov. 9, 2004, entitled "Vehicle Denial Security System," which is a continuation-in-art of PCT Application No. PCT/US2004/013494, filed May 3, 2004, entitled "Fiber Optic Security System For Sensing The Intrusion of Secured Locations," which is a continuation-in-pad of U.S. application Ser. No. 10/429,602, filed May 5, 2003, now abandoned entitled "Fiber Optic Security System For Sensing Intrusion Of Secured Locations," herein incorporated by reference and referred to as the "626,197; 013494; or 429,602 incorporated applications," respectively.

FIELD OF THE INVENTION

This invention is directed to an apparatus and method for a computerized optic fiber optic security system for detecting unauthorized activity within secured locations. More specifically, the invention is directed to a computerized monitoring system for monitoring a fiber optic security apparatus.

BACKGROUND OF THE INVENTION

With the increase in terrorist events in the United States, the need for effective security systems to sense intrusion into secured areas has greatly increased. For instance, a security system for the protection of a vast system of underground utilities accessed by manholes with removeable covers is needed. A highly effective system to detect entrance into these underground spaces and utilities is needed in order to protect against vandalization and terrorist activities within these spaces and the spaces to which these underground utilities lead. Heretofore, it has been known to use fiber optic sensors to detect theft of articles, intrusion into protected areas, as well as a variety of other purposes.

In another instance, a security system that is able to encompass remote areas and can be monitored from a remote location is needed. Typically, security systems for secured locations involve an outer security fence to protect an outer perimeter of a secured area. An inner fence protects the actual secured location against unauthorized entry. The area between the pair of fences is monitored constantly via motion sensors and motion sensitive cameras among other sensors. The pair of fences is traditionally located close to the secured location. Thus, once someone has breached the second of the pair of fences, they are close to the secured location. Thus, the area within which the security force has to intercept this person is very limited. It would be far more advantageous to allow notification of an attempted breach of the secured location from a greater distance than provided by the traditional setup known in the current state of the art.

The prior art security systems and sensors require a physical connection between the optic fiber and the moveable member, and also require electrical power at the location sought to be protected making them less useful for many security applications, including wide geographical area systems. More importantly, no provision is made for identifying the location of an intrusion event where large numbers of sensors are utilized.

Optical time-domain distance reflectometer (OTDR) devices are used to maintain fiber optic communication systems. For example, the OTDR may be used to sense a fiber breakage, water seepage, irregular bends, or other defects in one or more optical fibers of the fiber communication network along the routing path of the network. In large municipalities it is not uncommon for there to be a thousand miles of fibers in an optical fiber network.

SUMMARY OF THE INVENTION

The invention is a computerized fiber optic security system for detecting and evaluating unauthorized activity in a protected area. The fiber optic security system comprises a fiber optic cable having an optical sensor line, a fiber optic scanning unit connected to the fiber optic cable for estimating attenuations in the sensor line and providing scan signals on a continuous basis representing the condition of the optical sensor line. A computer readable medium is provided in communication with the fiber optic scanning unit. A computer in communication with the computer readable medium processes information from the scanning unit. Further, the fiber optic security system comprises a set of computer readable instructions in communication with the computer readable medium. The set of instructions includes receiving instructions for receiving initial scan signal information from the scanning unit, baseline instructions for establishing a baseline signal from the initial information representing the normal or undistributed condition of the optical sensor line, and scan instructions for repeatedly receiving scan signal from the scanning unit representing the instantaneous status of the sensor line. Further, the set of instructions include comparison instructions for determining if unauthorized activity has taken place based on a comparison of the baseline signal and the current scan signal, and fault instructions for transmitting a fault signal indicating the unauthorized activity has taken place. The computer executes the computer readable instructions to determine if a fault representing the unauthorized activity has taken place.

The fiber optic security system also contains an audible and/or visible output device in communication with the computer readable medium for outputting a warning to notify an attendant of the unauthorized activity. The system may also include a display for visually indicating the occurrence of a fault upon receiving a fault signal. The set of computer readable instructions may include mapping instructions for mapping the fault signal on a visual representation of the fiber optic cable on the display indicating the specific location of the fault.

Advantageously, the computerized security system further includes a set of level data in communication with the computer readable medium representing types of faults associated with levels of attenuations in the scan signals due to bending of the sensor fiber by unauthorized activity. The set of computer readable instructions include level instructions for comparing one or more attenuations from the scan signal to the set of level data to determine the specific type of fault associated with the attenuation, and instructions for determining the specific location of the activity based on the location of the attenuation on the scan.

A sensor(s) for the computerized security system may be the sensor line itself, as disclosed in U.S. Application Ser. No. 60/626,197 incorporated herein as referenced above, or the sensor(s) may be separate sensors connected to the optical sensor line as disclosed in PCT Application Serial no. PCT/US2004/013494 incorporated herein as referenced above. In the first case, the sensor line is impacted and bent directly by the unauthorized activity. In the second case, sensor(s) include a movable element which contacts and bends the fiber in response to the unauthorized activity.

In another aspect of the invention, a method for detecting unauthorized activity in a protected area is disclosed using a fiber optic cable having an optical sensor line, a scanning unit, and a remote computer. The optical line of the cable selected as a sensor line is scanned with the scanning unit initially to provide scan signals Information representing an initial scan signal is transmitted to the remote computer in order to determine a baseline signal representing normal attenuation in the sensor line. The baseline signal is then stored in the remote computer. Then, the sensor line is continuously scanned on a periodic basis, and the instantaneous scan signals are transmitted to the remote computer. The scan signals are compared to the baseline signal to determine if attenuation changes constitutes a fault in the optical sensor line due to activity. If so, a fault signal is transmitted to an indicator for warning that a fault has taken place in the line. The specific location is pinpointed by measuring the distance of the attenuation change. An associated audible and/or viewable output device is activated upon receiving the fault signal. The occurrence of a fault is visually indicated on an associated display screen upon receiving the fault signal to map the fault location on an associated visual representation of the fiber optic cable on the associated display. A determination is then made as to the specific type of fault that has occurred based on an evaluation of the characteristic of the attenuation change, e.g., break, severe bend, etc.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1A:
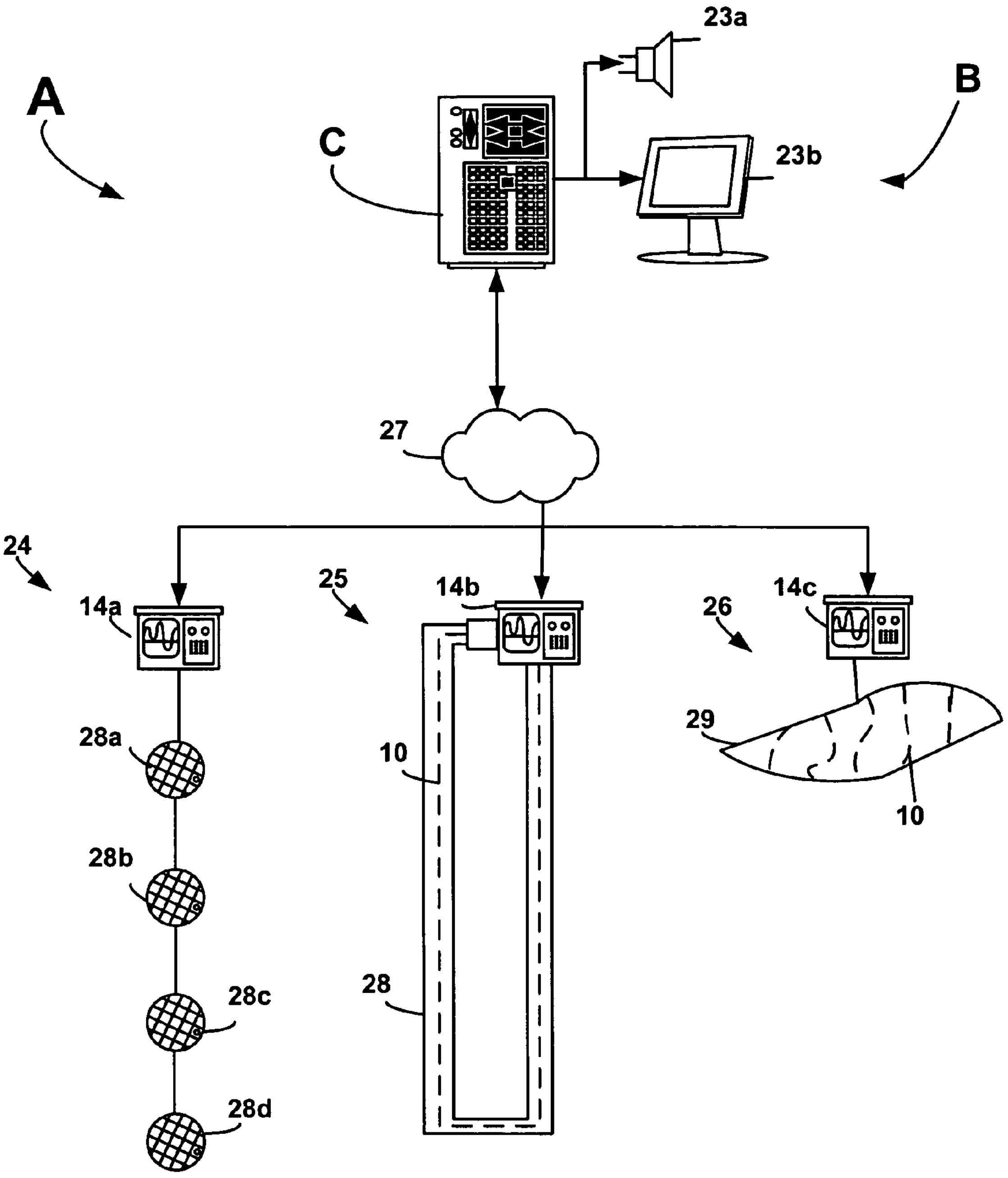
FIG. 1A is a schematic diagram illustrating one embodiment of a security system according to the invention.

The present invention is now described more fully herein with reference to the drawings in which the preferred embodiment of the invention is shown. This invention may, however, be embodied any many different forms and should not be construed as limited to the embodiment set forth herein. Rather, these embodiments are provided so that this disclosure will be thorough and complete and will fully convey the scope of the invention to those skilled in the art.

The detailed description that follows may be presented in terms of steps of methods or in program procedures executed on a computer or network of computers. These procedural descriptions are representations used by those skilled in the art to most effectively convey the substance of their work to others skilled in the art. These procedures herein described are generally a self-consistent sequence of steps leading to a desired result. These steps require physical manipulations of physical quantities such as electrical or optical signals capable of being stored, transferred, combined, compared, or otherwise manipulated. A computer readable medium can be included that is designed to perform a specific task or tasks. Actual computer or executable code or computer readable code may not be contained within one file or one storage medium but may span several computers or storage mediums. The term “host” and “server” may be hardware, software, or combination of hardware and software that provides the functionality described herein.

The present invention is described with reference to flowchart illustrations of methods, apparatus (“systems”), or computer program products according to the invention. It will be understood that each block of a flowchart illustration may be implemented by a set of computer readable instructions or code. These computer readable instructions may be loaded onto a general purpose computer, special purpose computer, or other programmable data processing apparatus to produce a machine such that the instructions will execute on a computer or other data processing apparatus to create a means for implementing the functions specified in the flowchart block or blocks.

These computer readable instructions may also be stored in a computer readable medium that can direct a computer or other programmable data processing apparatus to function in a particular manner, such that the instructions stored in a computer readable medium produce an article of manufacture including instruction means that implement the functions specified in the flowchart block or blocks. Computer program instructions may also be loaded onto a computer or other programmable apparatus to produce a computer executed process such that the instructions are executed on the computer or other programmable apparatus to provide steps for implementing the functions specified in the flowchart block or blocks. Accordingly, elements of the flowchart support combinations of means for performing the special functions, combination of steps for performing the specified functions and program instruction means for performing the specified functions. It will be understood that each block of the flowchart illustrations can be implemented by special purpose hardware based computer systems that perform the specified functions, or steps, or combinations of special purpose hardware or computer instructions.

Referring now to the drawings, an illustrative embodiment of the invention will be described in more detail.

Figure 1B:
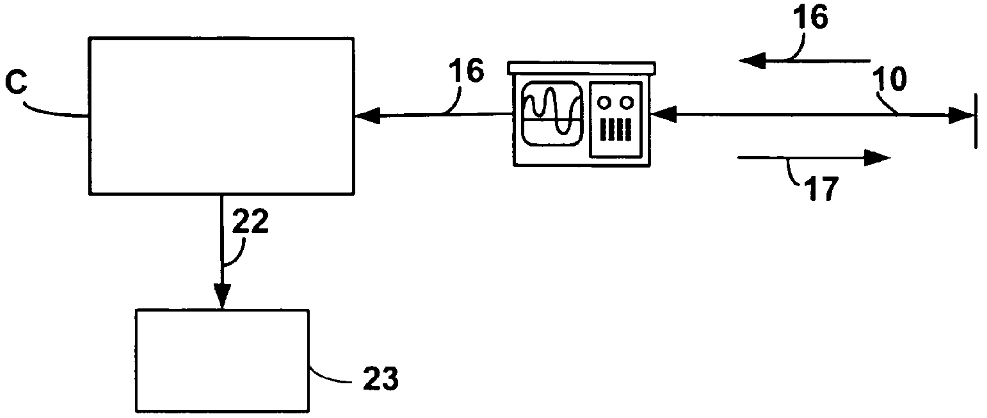
FIG. 1B is a block diagram illustrating components of the invention.
Figure 2:
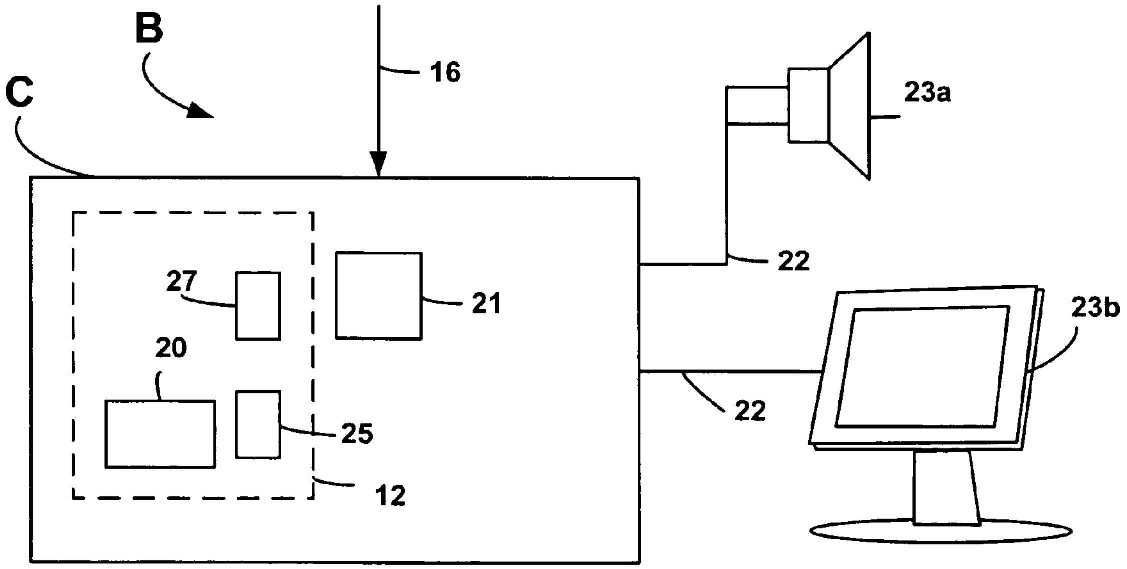
FIG. 2 is a block diagram illustrating the components of the invention.
Figure 3A:
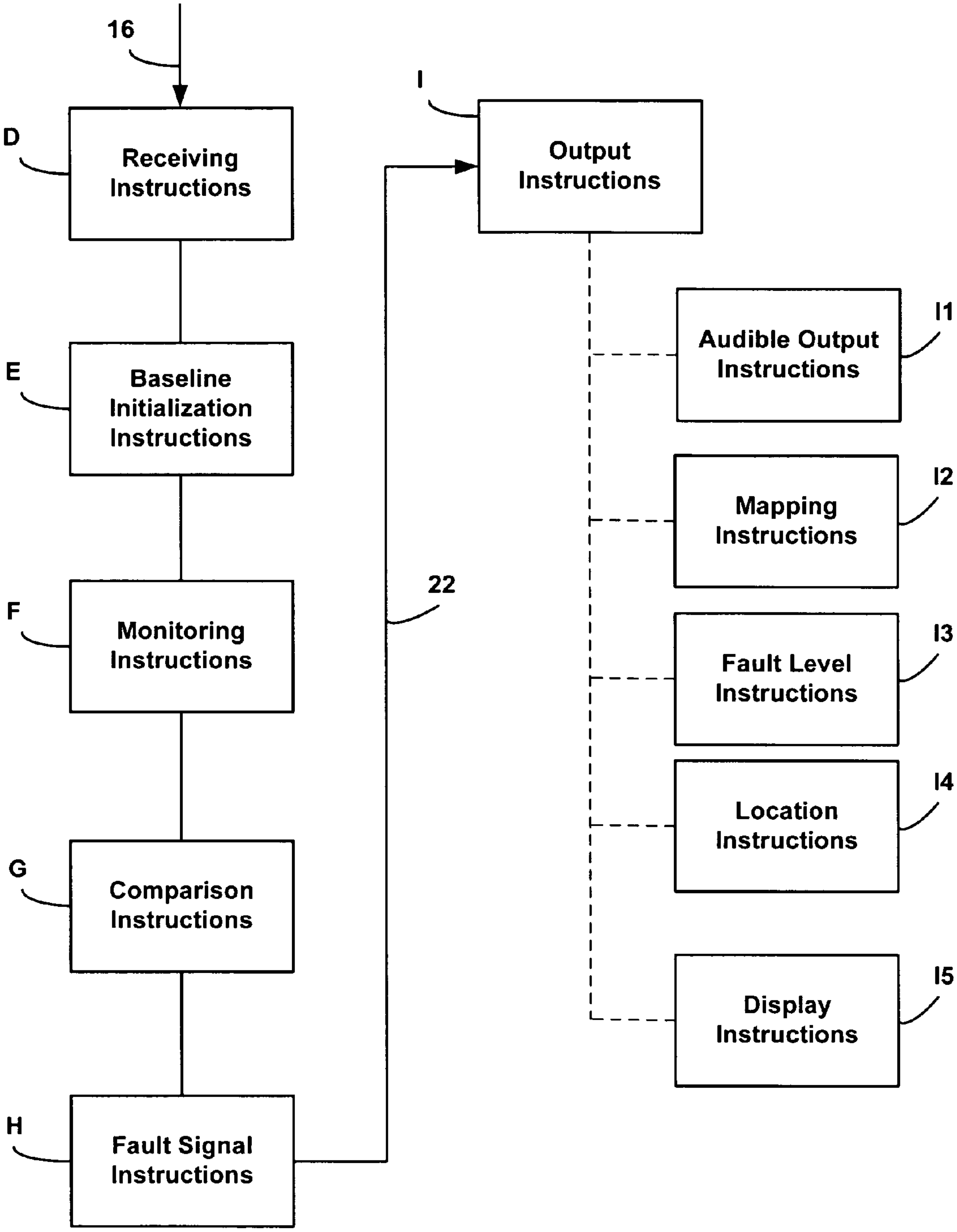
FIG. 3A is a block diagram illustrating basic computer readable instructions for deleting a fault condition in a fiber optical security system according to the invention.
Figure 3B:
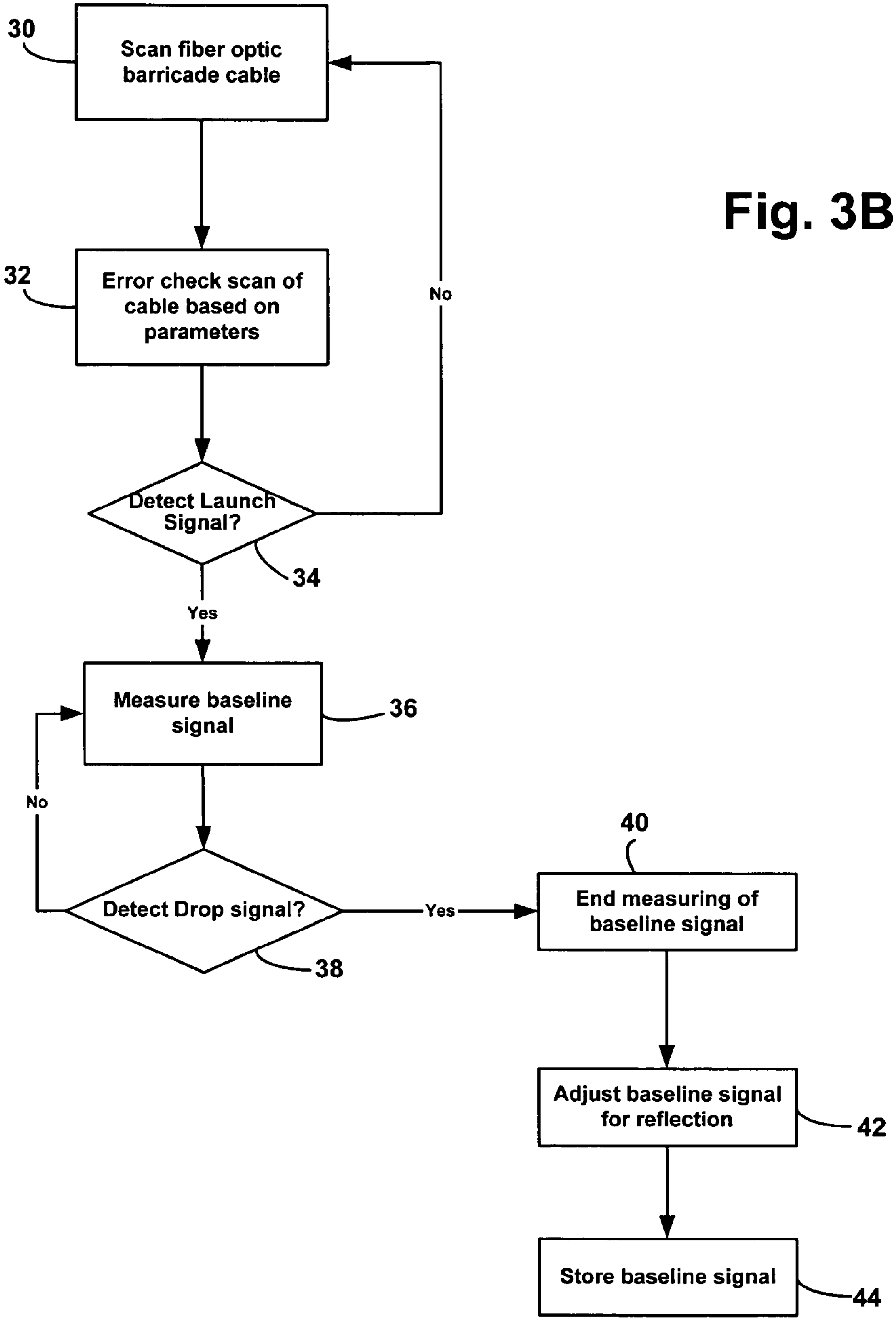
FIG. 3B is a flowchart illustrating the baseline initialization instructions of FIG. 3A.

As can best be seen in FIGS. 1A through 2, a fiber optic security system, designated generally as A, is illustrated for detecting unauthorized activity in a protected area comprising a fiber optic cable providing an optical sensor line 10. A fiber optic scanning unit 14 continuously pulses the optical sensor line and receives back scan signals 16 in real time estimating attenuations in the optical sensor line. A computerized interface system B, including a system computer C, receives and processes the scan signals. A computer readable medium 12 is in communication with the computer, and a computer program 20 includes computer readable instructions in communication with computer readable medium 12. The medium containing the computer readable instructions may reside in computer C or be accessible by the computer elsewhere. Referring to FIG. 3A, basic instructions include receiving instructions D for receiving scan signals 16 from scanning unit 14, baseline initialization instructions E for establishing a baseline signal 50 (FIG. 7) based on initial information from the scan signals, monitoring instructions F for monitoring the optical sensor line by automatically receiving the scan signals in real-time representing the condition of the sensor line in real-time, comparison instructions G for comparing said baseline signal and said scan signs in real-time, and fault instructions H for generating a fault signal 22 in response to a predetermined change in one or more scan signals indicating an unauthorized activity has taken place. Output instructions I process fault signal 22 and include audible output instructions I1, mapping instructions I2, fault level instructions I3, location instructions I4, and display instructions I5 for providing audible and/or visual notification of a fault, according to the processing of fault signal 22 by the output instructions. A processor 21 processes the instructions on the computer to generate a fault signal if unauthorized activity is detected. The computer transmits the fault signal to a warning device 23 to notify an attendant audibly and/or visually that the unauthorized activity has taken place.

Referring to FIG. 1A, illustrates an embodiment of a computerized fiber optical securing system which includes three fiber optic security networks 24, 25, and 26 connected to security interface system B. A fiber optic scanning unit 14 is provided for each fiber network. For example, the scanning unit may be provided by optical time domain reflectometers (OTDR) 14*a*, 14*b*, 14*c* of the type routinely utilized to monitor maintenance of fiber optic communication systems. Each scan unit 14*a*, 14*b*, and 14*c*, is connected in optical security networks 24, 25, and 26, respectively. Each fiber security network is connected to security interface system B directly or through an internet or intranet network 27. For illustrative purposes, network 24 may include a plurality of secured locations; shown, for example, as a series of utility manholes 28*a*, 28*b*, 28*c*, and 28*d*. The manholes include manhole manifolds and manifold covers which cover and secure the manholes and underground utility tunnels. Typically, fiber optic networks run through the underground tunnels to which access is provided through the manholes. Optical instruction sensors at the manholes detect movement of the cover. More details of such an optical security network can be found in the "013494 incorporated application." Optical security network 25 may be a vehicle denial security system as detailed in the "429602 incorporated application," which includes optical sensor line 10 extending centrally through a braided barrier cable 28. Breakage or major damage to the sensor line caused by a vehicle attempting a break through results in attenuations that are evaluated and recognized as a fault signal by the computerized security interface system.

In another example, optical security network 26 may be a "smart" security blanket system wherein one or more optical sensor lines 10 are incorporated into a blank or cover structure 29 covering a secured area or item, etc. Movement of the blanket to access the area underneath results in attenuation changes in the sensor lines recognized as unauthorized activity whereupon a fault signal is generated by the computerized interface system.

Computerized security interface system B and its operation will now be described with reference to a vehicle denial security network 24, it being understood, of course, that the computerized system and its operation is essentially the same for other applications, regardless of how attenuation changes are created in sensor line 10. Scan unit 14 is in communication with computerized security interface system B. Fault signals 22 are generated when a fault condition arises. As used herein, "fault condition" means a condition in which sensor line 10 has been cut or broken through by a vehicle, and/or encountered material damage to vehicle denial cable 28 of optical security network 32, as distinguished from accidental damage. Scan unit 14*b* continuously pulses the optical sensor line 10, in accordance with scanning instructions processed by computer C, located within the braided cable 40. For example, the computer may control the scan unit to pulse the sensor line every four seconds. The scan signals 16 are reflected back, and computer C is programmed to compare the scan signals to the baseline signal 50 (FIG. 7) to determine whether a predetermined signal (attenuation) deviation representing a fault condition has occurred. In the event the fault condition is detected, fault signal 22 is generated by the computer along with a calculation of the type of fault and location of the fault condition. A set of level data 25 is included in communication with computer C. The set of level data may be in the form of a look-up table containing attenuation levels and corresponding fault information. For example, a major attenuation on multiple fibers is associated with the use of explosives to instantaneously destroy multiple fibers in a single cable. An attenuation spanning a distance of the fiber appears instantly and then quickly disappears is associated with a vehicle driving over the cable. This information is transmitted to the attendant, this providing needed information to security personnel. For example, display 23 may include a map of the cable routing depicting the location of the break or damage condition on the map.

When interface system B begins operation baseline signal 50 must be established. The baseline signal represents the status of the fiber optic cable being monitored at a normal or undisturbed state. Initially, computer C, processing baseline initialization instructions E as shown in FIG. 3A, signals scanning unit 14*b* to pulse sensor line 10. The pulse creates a significant rise in signal level at 52, referred to as a reflective launch spike, proceeded by some noise at 54. The normal signal levels start the beginning of the baseline signal. The system continues to establish the baseline until a drop to the noise floor 56 occurs indicating the end of the sensor line being scanned. After the drop, further noise occurs. The computer system will then remove a small portion at the beginning of the baseline and a small portion at the end that are merely reflections of the noise launch, and drop. The final baseline signal 50 (FIG. 7) is then stored, for example, in computer readable memory 12, for comparison to future attenuations in the sensor line to determine if a fault has occurred.

During the operation, the computer system controls scanning unit 14 to continuously pulse optical sensor line 10 and receive back scan signals 16 representing real-time scans. With each incoming scan signal, the computer system checks to see if any abnormal attenuations are detected. If a fault attenuation is detected, its location is compared to the baseline signal previously acquired. If the attenuation matches a pre-existing attenuation from the baseline, then the computer system will not report a fault. Any sensor line being pulsed will have some bends and attenuations in its baseline signal. A straight cable extending perfectly vertically from scanning unit 14*b* will be one of the few instances that no attenuations will be found in the baseline. Thus, every attenuation detected by the computer system will not indicate a fault and may simply indicate a pre-existing bend. Further, some attenuations will be slight, indicating a slight movement of the cable that does not indicate a fault. The attenuations that most concern a user of this system will be those that show a breach or significant damage to the sensor line, and hence a fault condition. As can best be seen in FIG. 8, an attenuation representing a significant fault at 58 is shown. This attenuation matches a complete break in cable 40, and the computer has been programmed to recognize the attenuation as just that via level data 25 described above. As can best be seen in FIG. 9, an attenuation matching a significant bend 40*b* in cable 40 is shown. The location of the attenuation on the signal will correspond to a location on the sensor line where a breach may have occurred. Thus, the computer system would be able to display the location of the breach on an associated map by associating the attenuation in the signal with a breach in the barricade cable. Further, a set of distance data 27 is provided in a look-up table format. Prescribed locations, such as guard posts, are included in table with the distance associated with each prescribed location. The system compares the distance of the attenuation with the distances in the distance data. If the distance of the attenuation matches a prescribed location, the prescribed location is transmitted to an attendant. Thus, security personnel are notified of any faults occurring at prescribed locations.

Referring now to FIGS. 3-6, flowcharts illustrating the operation and instructions of the system will now be described. FIG. 3B illustrates the baseline initialization instructions E for initializing the computerized system to establish baseline signal 50 associated with optical sensor line 10 during an undisturbed condition, as shown in FIG. 7. At step 30, the system pulses the scanning unit to begin the scan of the sensor line. At step 32, the system error checks the scan of the line based on predetermined parameters. If valid data is collected, the system proceeds to establish the baseline. Otherwise, an error is given and execution is stopped. If the data is valid, the system will scan the sensor line until it detects a reflective spike in data above the noise floor indicative of the launch at step 34. The launch occurs when a significant rise above the noise floor occurs in the scan signal from the scanning unit. Any insignificant spikes may simply indicate noise level and do not show the true beginning or end of the sensor line baseline signal. Once the system has detected launch 52 at step 34, it will measure the baseline at step 36 while searching for another reflective spike and a drop 56 starting from the end of the data at step 38. The drop is the inverse of the launch indicating the end of the sensor line and baseline. The drop returns the signal to the level of noise. At this point, the system will record the end location for the sensor line. At step 42, the baseline is adjusted for reflection. There is a distance immediately following the launch and immediately preceding the drop that is not a measurement of the baseline signal, but rather a reflection. This reflection should not be considered part of the baseline, therefore, it is removed from the baseline at step 42. Once the launch and end have been found and adjusted, the sensor line is searched for non-sensor attenuations between the launch and ends. If found, the non-sensor attenuations will be shown to the user. The user will either accept the displayed attenuations or fix any problems and retake the baseline. At step 44, the final baseline signal 50 is established by the computer system and stored. The baseline signal is to make all comparisons to future real-time scans to determine if a fault attenuation has occurred.

Figure 3C:
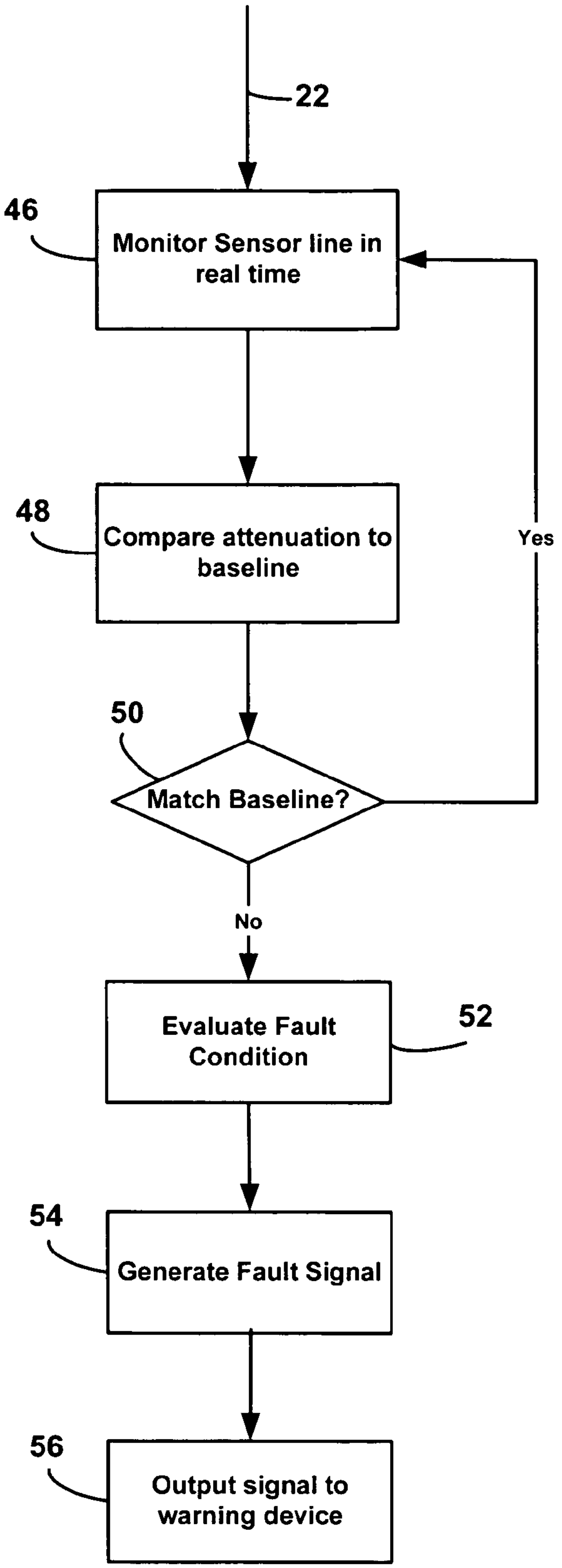
FIG. 3C is a flowchart illustrating the monitoring, comparison, and fault signal instructions of FIG. 3A.
Figure 8:
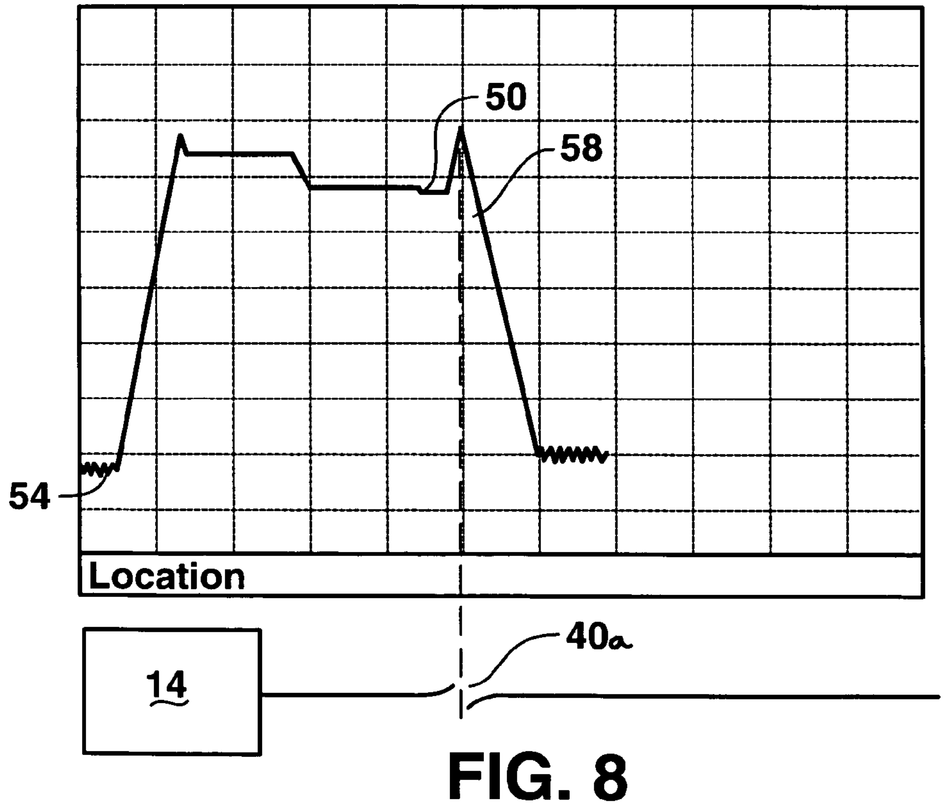
FIG. 8 is an illustration of a scan signal corresponding to a predetermined fault type according to the invention.
Figure 9:
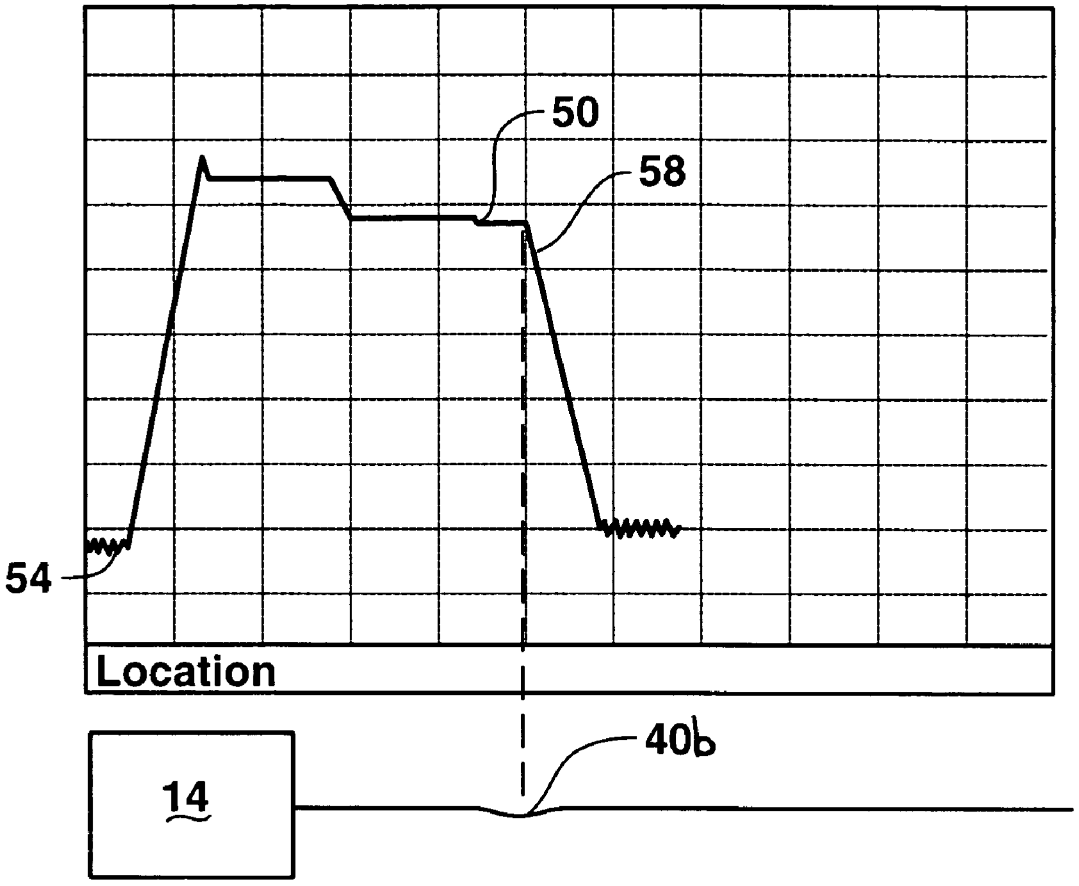
FIG. 9 is an illustration of a scan signal corresponding to a predetermined fault type according to the invention.

FIG. 3C illustrates the monitoring instructions F, comparison instructions G, fault instructions H, and output Instructions I. After the baseline signal has been acquired, the system performs continuous real-time monitoring at step 46. As described above, the system pulses the fiber optic cable, e.g. every four seconds, to obtain scan signals containing attenuations representing the status of the fiber optic cable. Comparison instructions G then compare attenuations in the scan signals to the baseline signal at step 48. If attenuations match the baseline at step 50, then monitoring instructions F will be processed to continue to monitor the scan signals in real-time. If an attenuation from a scan signal does not match the baseline signal at step 50, then fault instructions H are processed. At step 52 the fault condition is evaluated by the system. This evaluation can include a comparison at the attenuation to level data 25 to determine the type of fault associated with the attenuation by fault level instructions I3. If the attenuation does not match an attenuation in the baseline signal, then the attention is evaluated according to fault type versus attenuation data stored in computer C to determine the specific type of fault condition, e.g., mass destruction to, or complete break of, cable 40. For example, FIG. 8 illustrates an attenuation 16*a* which occurs when cable 40 is cut through at 40*a*. Upon evaluating the fault condition, the system generates fault signal 22. At step 56 output Instructions I outputs signal 22 to activate a warning device, thus notifying an attendant of unauthorized activity. As described above, the warning device is one or more of an audible indicator, a visual indicator such as a display or other warning device.

Figure 4:
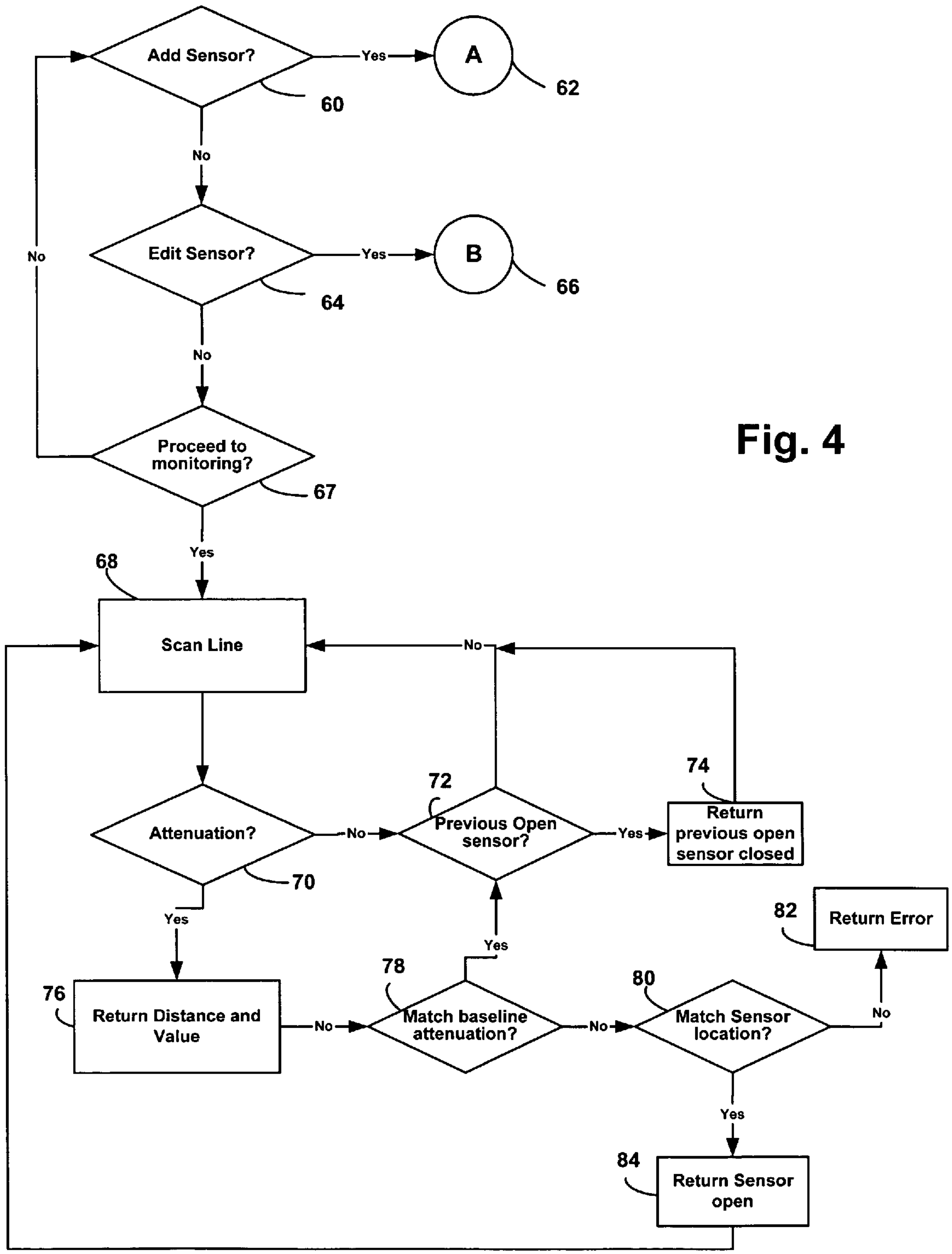
FIGS. 4, 5 and 6 are flowcharts illustrating instructions and operation of a fiber optic security system of the type detecting intrusion into secured areas accessible through manhole covers or other movable members according to the invention.

FIG. 4 illustrates the operation of the computer interface system in regard to manhole optical sensor network 24. After establishing the baseline signal, the user will have the option of adding a sensor or editing sensors at step 60 and 64, respectively or proceed to monitoring. The process of adding a sensor is explained more fully in FIG. 5. The process of editing a sensor is explained more fully in FIG. 6 described below. Assuming the user has already added sensors to the system, the user may then proceed to monitoring at step 67. Then, a scan of the sensor line will take place at step 68. The system will determine if any attenuation has taken place at step 70 while scanning the line. If no attenuation has taken place, the system determines if a previous scan had indicated a sensor attenuation. If not, the system will return to step 68 and continue to scan the line until an attenuation is found. If, at step 72, a sensor attenuation had been previously found, the system returns information indicating that the previous sensor attenuation no longer exists. At this point, the system will continue to monitor the line by pulsing the scanning unit and receiving reflected scan signals 16. If the system detects an attenuation at step 70, then at step 76 the distance or location, and value of the attenuation is read according to comparison instructions. If the attenuation matches a baseline attenuation then the system returns to step 68 and continues to monitor and scan the line. Attenuations do not necessarily have to indicate a fault. Sometimes attenuations will indicate the crimping of the fiber optic cable or some other bend in the fiber optic cable. If these existed at the time the baseline was established and the attenuation matches this baseline attenuation, no action is taken.

In the case of optical security network 24, if the attenuation does not match the baseline attenuation, comparison instructions G determine if the attenuation matches the location of a sensor (e.g. manhole 38) at step 80. If the attenuation location does not match a baseline attenuation or the sensor location then at step 82, the system returns an error. This error may indicate that the signal has been lost, the line has been cut, etc. If at step 80 a sensor location is matched to the attenuation detected at step 70, then at step 84 the system will return a fault signal according to fault instructions H. The computerized system will then continue to scan the line. The fault signal can activate multiple indicators. For example, an audible indication may be given to the user of the system. A visual indication may be given to the user indicating the location of the open sensor. In a further embodiment, the visual display may comprise a map with an indication at the point on the map where the sensor is currently open.

Figure 5:
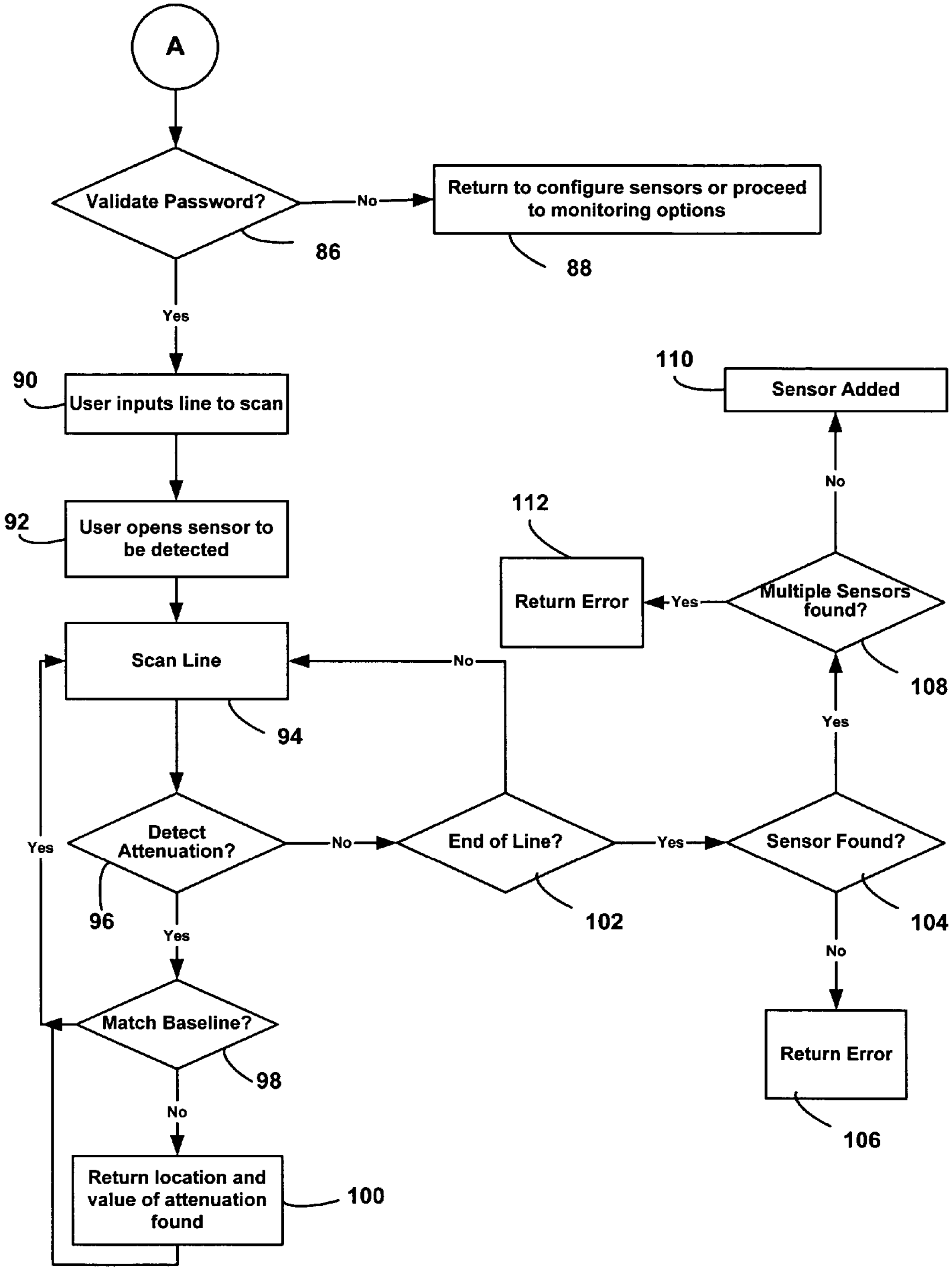

FIG. 5 illustrates the process conducted by a user when adding a sensor to the senor line of optical security network 24. This process may take place the first time the system is used, or when new sensors are added to an existing line. At step 86, the users password is validated. If it is not the correct password, the system will return to the previous menu screen. At step 90 the user inputs the line to be scanned. This step is only needed when multiple sensor lines are used in network 24 and are controlled by one computer. If only one line is being controlled by the computer, then the system would begin at step 92. At step 92 the user manually actuates the sensor to be detected. Then at step 94 the process of scanning the line begins. If an attenuation is detected at step 96, then the system compares the attenuation to the baseline at step 98 to determine if it matches. If it does match the baseline, then the system continues to scan the line. If it does not match the baseline, then at step 100 the system returns to location of the sensor found. After returning to the location of the sensor found, the system continues to scan the line. If no further attenuations are found at step 96, then the system determines if the end of the line has been found at step 102. If it is not the end of the line, then the system will continue to scan the line at step 94. If it is the end of the line, the system will advance to step 104 to determine if a sensor has been found. If no sensor is found by the time the scanning has reached the end of the line, then an error has occurred and an error message is returned to the user at step 106. If sensors have been found at step 104, the system determines if multiple sensors were found at step 108. If multiple sensors were found at step 108, again an error has occurred and an error message is returned to the user at step 112. If only one sensor has been found at step 108, then that sensor is added at step 110. Once the sensor has been added the system will scan the line knowing the location of this sensor.

Figure 6:
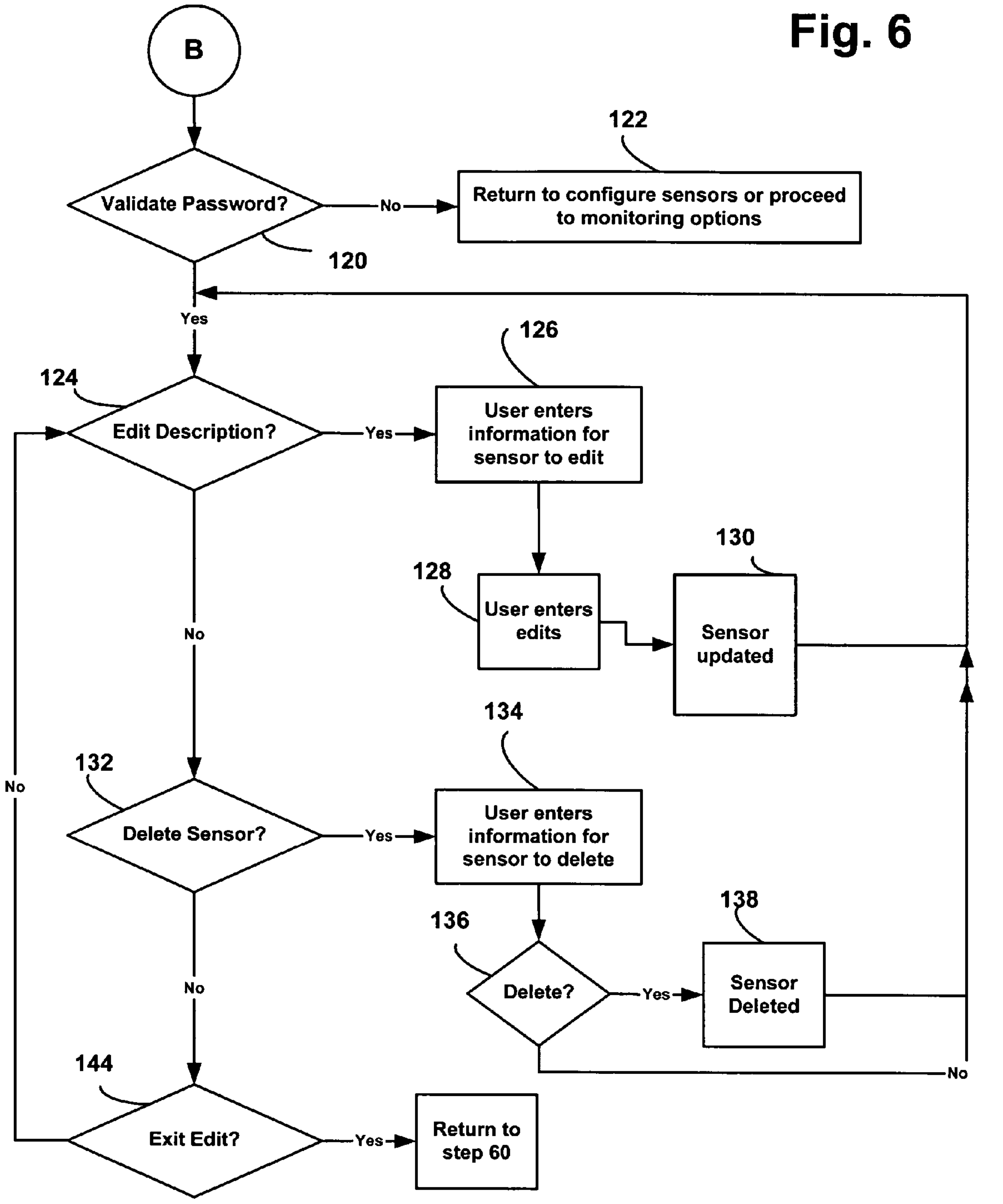
Figure 7:
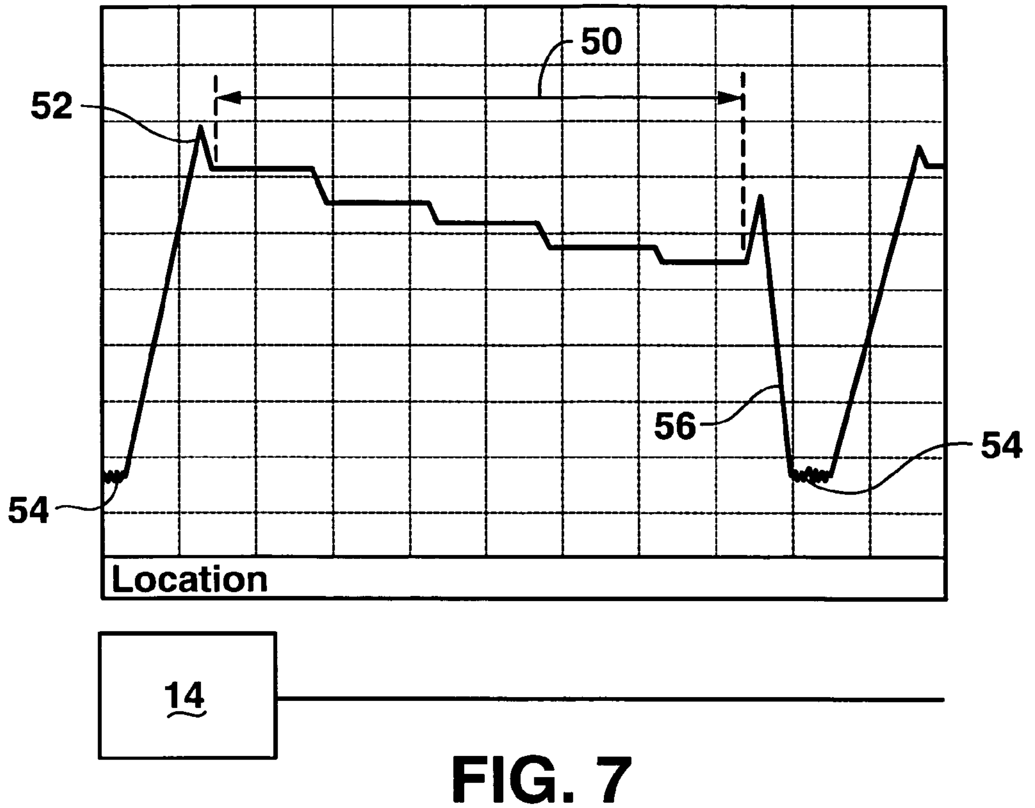
FIG. 7 is an illustration of a baseline signal used by the system.

Referring now to FIG. 6, the process of editing a sensor at 38 is described. Prior to beginning any editing, the system must validate the password of a user at step 120. If that password is not validated, then at step 122, the user is returned to the configure sensors or proceed to monitoring options. If the user wishes to edit the description of a sensor at step 124, then they must enter information for the sensor to be edited at step 126. Once that information has been entered, the user is able to edit the description associated with the sensor to be edited at step 128. Once that information has been entered, the sensor is updated at step 130 and the system returns to step 124. If the user wishes to make further edits to further sensors they may do so at step 124. If not, then the user may delete the sensor at step 132. If the user chooses to delete the sensor at step 132, then they must enter the information for the sensor to be deleted at step 134. Once the user has entered in information indicating which sensor they wish to delete, they must click delete to ensure they wish to delete that sensor at step 136. If they do not wish to delete the sensor at step 136, they click exit and then the system will return to the main menu area to allow the user to edit descriptions or delete sensors. If the user still wishes to delete the sensor at step 136, then the sensor is deleted at step 138 and the system returns to the main menu area. If the user wishes to exist the edit screen at step 144, then the system returns to step 60.

Thus, it can be seen that an advantageous computerized system and method can be had according to the invention for a fiber optic security system wherein reflected signals from an optic sensor line can be compared to a baseline signal and analyzed to see if a predetermined fault has occurred corresponding to a prescribed characteristic reflective signal.

While a preferred embodiment of the invention has been described using specific terms, such description is for illustrative purposes only, and it is to be understood that changes and variations may be made without departing from the spirit or scope of the following claims.

What is claimed is:

1. A fiber optic security system for detecting unauthorized activity in a protected area comprising:

a fiber optic cable having an optical sensor line for transmitting and receiving scan signals;

a fiber optic scanning unit connected to one end of said optical sensor line for transmitting scan signals outbound along said optical sensor line and said scanning unit receiving return scan signals reflected back along the same said optical sensor line;

a system computer for receiving said return scan signals from said scanning unit and processing said return scan signals to determine the existence of a fault condition representing the unauthorized activity;

a computer readable medium in communication with said computer;

a computer program including computer readable instructions stored in said computer readable medium which includes, receiving instructions for receiving said return scan signals from said scanning unit at said computer, baseline initialization instructions for establishing a baseline signal of the sensor line based on initial information from said scan signals representing an undisturbed state of said sensor line, and storing said baseline signal in computer memory, monitoring instructions for monitoring said optical sensor line to automatically receive said returned scan signals from said scanning unit in real-time representing the condition of said optical sensor line in real-time, comparison instructions for determining if unauthorized activity has taken place based on a real-time comparison of said baseline signal and said return scan signals, fault instructions for generating a real-time fault signal in response to a predetermined change in one or more of said return scan signals representing a fault condition based on said real-time comparison indicating the unauthorized activity has taken place;

evaluation instructions for processing the change in said return scan signal to determine the type of fault condition and location of the unauthorized activity that has occurred; and said computer outputting a warning in response to said fault signal to notify an attendant that the unauthorized activity has taken place.

2. The security system of claim 1 further comprising:

an audible output device responsive to said system computer for audibly indicating the transmission of said fault signal.

3. The system of claim 1 further comprising:

a display in communication with said system computer; and said set of computer readable instructions include display instructions for visually indicating the occurrence of a fault on said display.

4. The system of claim 3 wherein said set of computer readable instructions include mapping instructions for mapping said fault signal as a visual representation of a specific geographic location of the fault.

5. The system of claim 1 wherein said comparison instructions include instructions for determining if said returned scan signal contains attenuations, comparing said attenuations to said baseline signal, and transmitting a fault signal if said attenuations do not match said baseline signal.

6. The system of claim 5 further comprising:

a set of fault level data stored in a computer readable medium in communication with said system computer representing types of fault conditions associated with different levels of attenuations; and said evaluation instructions evaluating the level of signal change in association with said fault level data to determine type and cause information for the fault condition associated with said attenuation and transmitting the type of fault for display.

7. The system of claim 5 further comprising:

a set of distance data in communication with said system computer representing prescribed locations associated with corresponding distances in said distance data; and said set of computer readable instructions include distance instructions for determining the distance of the fault based on the position of said attenuation on said scan, comparing the distance of the fault to said distance data, determining the prescribed location of the fault for display, and transmitting the prescribed location of the fault for display.

8. The system of claim 1 further comprising:

at least one sensor disposed along said fiber optic cable for detecting an intrusion along said fiber optic cable at prescribed locations and causing an attenuation in the scan signal representing the intrusion.

9. A computerized fiber optic security system including a fiber optic sensor line, a fiber optic scanning unit connected to one end of said sensor line for launching scan signals along the sensor line, and receiving return scan signals reflected back along the sensor line, and a system computer for receiving and analyzing said return scan signals to detect unauthorized activity in a secured area wherein said system comprises:

a computer readable medium;

a computer program residing on said computer readable medium including a set of computer readable instructions which include, scanning instructions for transmitting light pulse scan signals outgoing along said sensor line;

receiving instructions for receiving said return scan signals at said scanning unit returning back along the same said sensor line, baseline initialization instructions for establishing a baseline signal based on initial information from said scan signals and storing said baseline signal in said computer readable medium, monitoring instructions monitoring said optical sensor line to receive said return scan signals in real-time representing the condition of said optical sensor line in real-time, comparison instructions for determining if unauthorized activity has taken place based on a real-time comparison of said baseline signal and said return scan signals, fault level evaluation instructions for evaluating said return scan signals upon determining an unauthorized activity has occurred to provide type and geographical location information for the activity, and fault instructions for generating a real-time fault signal in response to determining the unauthorized activity has occurred.

10. The system of claim 9 wherein said set of computer readable instructions include audible output instructions for activating an associated audible output device in response to receiving said fault signal.

11. The system of claim 9 wherein said set of computer readable instructions include display instructions for visually indicating the occurrence of a fault on an associated display.

12. The system of claim 9 wherein said set of computer readable instructions include mapping instructions for mapping said fault signal on a visual representation of the fiber optic cable on the display whereby a specific location of the fault is indicated.

13. The system of claim 9wherein said comparison instructions include instructions for determining if said return scan signals contain attenuations, comparing said attenuations to said baseline signal, and transmitting a fault signal if said attenuations do not match said baseline signal.

14. The system of claim 13 further comprising:

a set of level data stored in a computer readable medium in communication with said computer readable medium representing types of faults associated with different levels of attenuations; and said fault level evaluation instructions processing at least one attenuation from said return scan signal with said level data to determine the type of fault associated with said attenuation and transmitting the type of fault for display.

15. The system of claim 13 further comprising:

a set of location data stored in a computer readable medium in communication with said computer readable medium representing prescribed locations associated with corresponding distances;

said set of instructions including location instructions for determining the distance of the fault based on the position of said attenuation on said scan and determining the prescribed location of the fault based on a comparison of the distance of the fault and said set of location data.

16. A computerized method for detecting unauthorized activity in a protected area in real-time using a fiber optic cable as an optical sensor line, a optical fiber scanning unit connected to one end of said optical sensor line, and a remote computer operatively associated with said scanning unit, said method comprising:

scanning said optical sensor line by transmitting outgoing scan signals from said fiber scanning unit and obtaining return scan signals representing the real-time state of said sensor line reflected back along the same said optical sensor line to said scanning unit;

receiving said return scan signals from said scanning unit at said remote computer;

processing the return scan signals to determine an initial baseline signal representing the state of said sensor line in a normal, undisturbed state;

storing said initial baseline signal in a computer readable memory accessible by said remote computer;

continuously monitoring said optical sensor line using said return scan signals in real-time by said remote computer;

comparing said return scan signal to said baseline signal;

determining if a fault condition indicating unauthorized activity has occurred at a location along said sensor line based on an predetermined attenuation change in said return scan signal as compared to said baseline signal;

evaluating return scan signal upon occurrence of unauthorized activity to determine the fault condition and likely cause of the attenuation change;

generating a fault signal indicating that a fault correlated to said unauthorized activity has occurred based on said attenuation change; and providing a warning of a fault in response to said fault signal.

17. The method of claim 16 further comprising activating an associated audible output device upon receiving said fault signal from said remote computer.

18. The method of claim 16 further comprising visually indicating the occurrence of a fault on an associated display screen upon receiving said fault signal.

19. The method of claim 18 further comprising mapping said fault signal on a visual representation of said fiber optic cable on said associated display.

20. The method of claim 16 further comprising determining the location and type of the fault that has occurred evaluating said return scan signal with a set of fault type data stored in computer readable memory representing different attenuations or spikes corresponding with different fault conditions.

* * * * *